Oct. 20, 1931.  J. T. MOORE  1,828,375

WHEEL GUIDE

Filed Feb. 26, 1929    2 Sheets-Sheet 1

Inventor
J. T. Moore,

By *Church & Church* his Attorneys

Oct. 20, 1931.  J. T. MOORE  1,828,375
WHEEL GUIDE
Filed Feb. 26, 1929   2 Sheets-Sheet 2
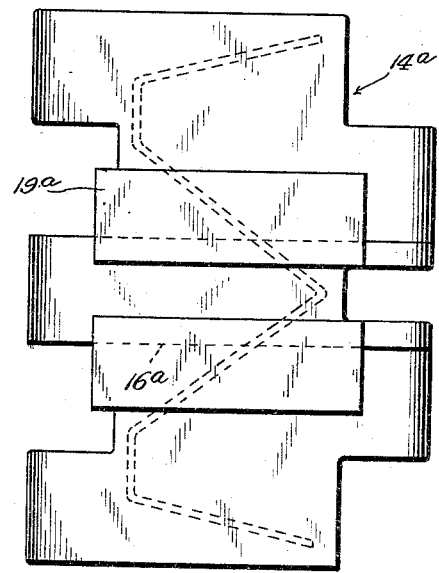
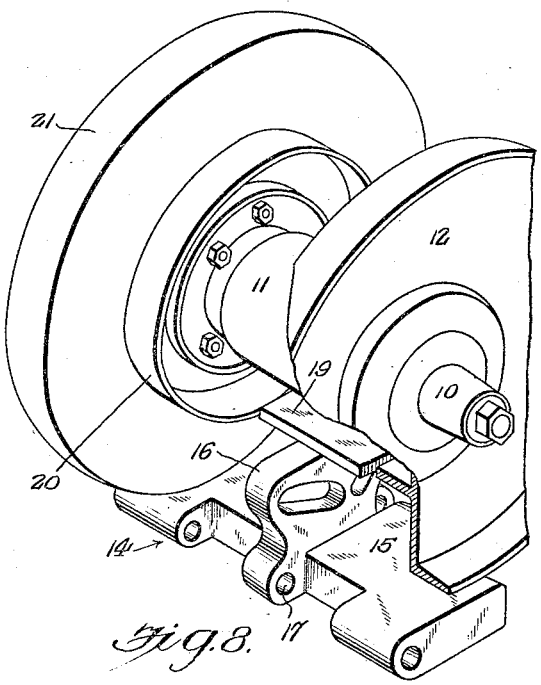
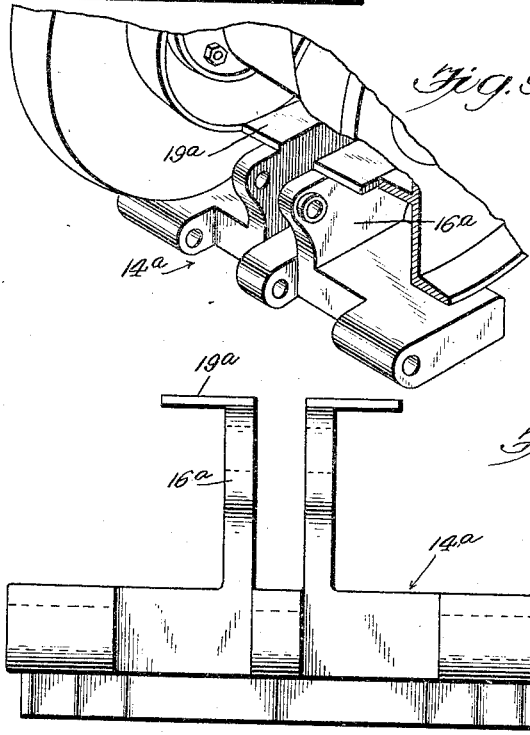
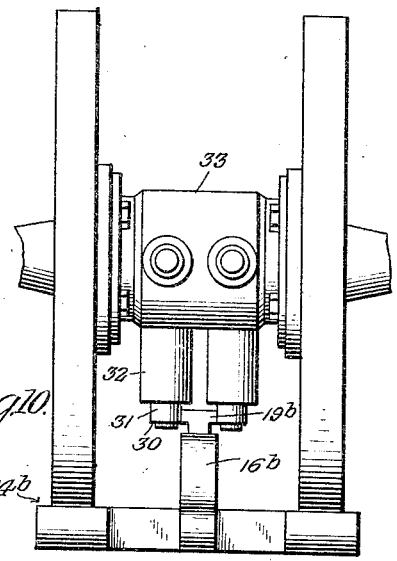

Patented Oct. 20, 1931

1,828,375

UNITED STATES PATENT OFFICE

JOHN TURNER MOORE, OF READING, PENNSYLVANIA, ASSIGNOR, BY MESNE ASSIGNMENTS, TO REX-WATSON CORPORATION, OF CANASTOTA, NEW YORK, A CORPORATION OF NEW YORK

WHEEL GUIDE

Application filed February 26, 1929. Serial No. 342,812.

This invention relates to improvements in endless track mechanisms of the type now commonly used on tractors and consisting of a series of tread links in the form of an endless chain which constitutes the surface on which the wheels of the tractor or other vehicle travel.

The peripheries of the wheels travel on the inner surfaces of the links and these surfaces are formed with means for preventing any appreciable movement of the links axially or laterally of the wheels. Usually these means take the form of guide ribs or projections on the wheel engaging surfaces of the links, said ribs or projections contacting with the wheels at their peripheries. As the links pass from around the wheels, they leave the peripheries of the latter at a tangent and it has been found that the relative movement between the wheels and guide ribs of the links, both at this point as well as at the point where the links come into engagement with the wheels, is such that the guide ribs soon become worn to such an extent as to render it necessary to replace the links because of the lateral play permitted the links by the worn ribs. In view of the foregoing, the primary object of this invention is to reduce the wear on the guide members, thereby maintaining a proper working relation between the links and wheels and consequently increasing the life of the links.

More specifically, the invention consists in providing means at a point spaced radially inward from the periphery of the wheels or at a point intermediate the peripheries and axes of the wheels for preventing lateral movement of the links on the wheel peripheries.

With these and other objects in view, the invention consists in certain details of construction and combinations and arrangements of parts, all as will hereinafter be more fully described and the novel features thereof particularly pointed out in the appended claims.

In the accompanying drawings:—

Figs. 5 and 6 are views similar to Figs. 3 and 4 respectively of a link adapted to be connected to the link shown in those figures;

Fig. 8 is a perspective view (partly in section) of the link shown in Figs. 3 and 4 in the position assumed by it just as it passes off of the wheel;

Fig. 9 is a similar view showing a wheel and the link of Figs. 5 and 6; and

Fig. 10 shows a modified form of guide means.

Figure 1:
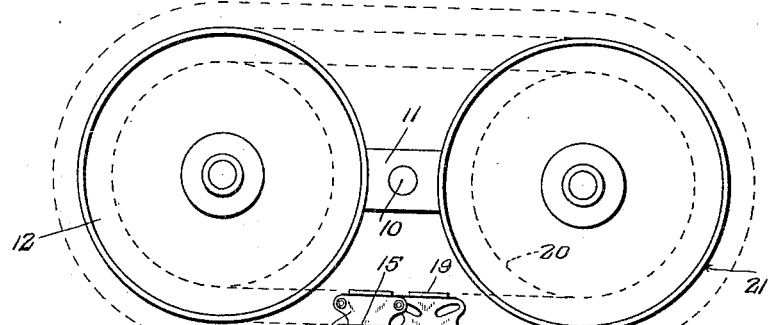
Figure 1 is a diagrammatic view illustrating the spaced side wheels of an ordinary type of cart with an endless link belt track extending around said wheels, a pair of links only being shown and the remainder indicated by dotted lines.
Figure 2:
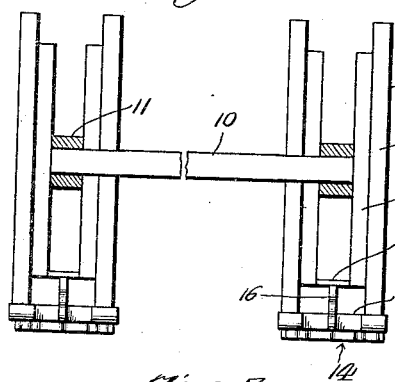
Fig. 2 is a sectional view transversely of Fig. 1, this view being taken through the vehicle axle but showing said axle and the links in elevation.
Figure 4:
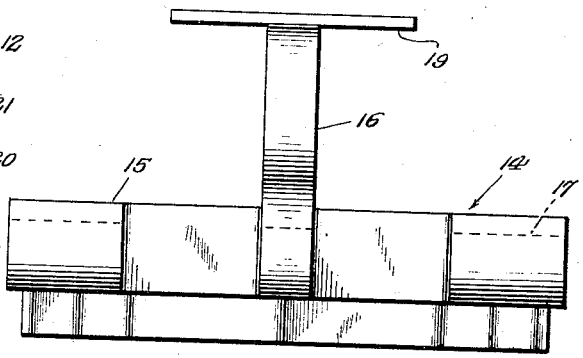
Fig. 4 is an end view of the link shown in Fig. 3.
Figure 3:
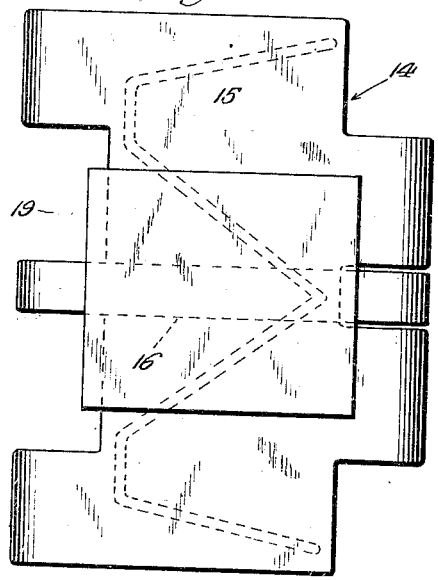
Fig. 3 is an inner plan view of one of the links.
Figure 7:
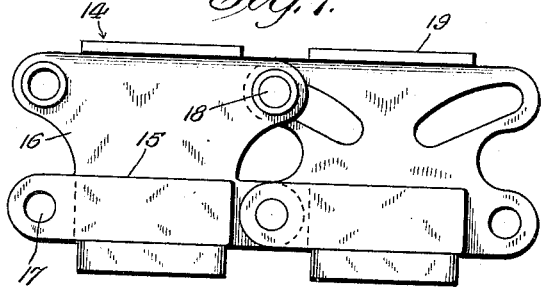
Fig. 7 is a side elevation of the two links connected together.

The vehicle illustrated in Figure 1 comprises a supporting axle 10 for a cart or other type of body and mounted on said axle are axially spaced wheel supporting frames 11. Freely journaled in the opposite ends of frames 11 are wheels 12 for engaging the chain links, as is well understood. These chain links form endless belts 13 that extend around the front and rear wheels 12 of each frame, said belts constituting an endless ground engaging track upon which the wheels ride in the usual manner. Belts of this nature are well known and, as above pointed out, the present invention relates to an improved construction of wheel and belt link comprising means for limiting lateral movement of the links relatively to the peripheries of the wheels as they pass around the latter.

Such limiting means are broadly old, but in most instances such means have been located at the periphery of the respective wheels, a point at which there is a considerable relative movement of the links and wheels as the links come into contact and move out of contact with the wheels. This relative movement of said parts at this point is such that the limiting or what may be termed guiding means for preventing lateral movement, soon become worn to such an extent that the links are permitted too much lateral play. To overcome this, the guiding means for preventing lateral movement of the links as they pass around the wheels are formed at a point intermediate the peripheries and axes of the wheels or at a point spaced radially inward from the wheel peripheries. This may be accomplished in various ways, the invention being claimed in its broader aspect in the present application, and specific embodiments thereof, such as illustrated in Fig. 10, being made the subject matter of other applications filed of even date herewith.

Referring particularly to Figs. 1 to 4 and 8, the link 14 has a substantially plain surface 15 at each side of its inner face over which the wheels run and intermediate said surfaces 15 there is an upstanding rib 16. At each end of the link and the rib are apertures 17 through which pins 18 extend for connecting contiguous links of the belt. The particular manner in which the links are formed, as far as this connection is concerned, forms no part of the present invention and need not be described in further detail.

The wheels 12 are arranged in laterally spaced pairs with the ribs 16 projecting axially inward between said wheels and at a point intermediate the peripheries or treads 21 and the axes of the wheels, said ribs are formed with laterally extending flanges 19 whose side edges cooperate with guide surfaces on the wheels for preventing undue lateral movement of the links as they pass around the wheels. These guide surfaces on the wheels are preferably formed by flanges 20, the wheel body being of disc-like formation and said flanges being located on said body at a point spaced radially inward from the peripheries of the wheels to register with the flanges on the link ribs.

The links 14 just described are usually referred to as the male links and they differ from links 14$^a$, called the female links, by reason of the fact that the latter are each formed with two upstanding ribs 16$^a$ in lieu of one rib 16, as in the case of links 14. The ribs 16$^a$ of these female links are formed with oppositely extending guide flanges 19$^a$, adapted to cooperate with the wheel flanges 20 just the same as the guide flanges on links 14.

By locating the guiding members radially inward from the peripheries of the wheels, those portions of the surfaces of the links that engage the wheel peripheries may be made perfectly plain. More important, however, is the fact that this location of the guiding members reduces the wear thereon because the relative movement between the links and wheels in a vertical plane at those points where the links come into and move out of engagement with the wheels, is considerably less, as compared with the corresponding movement when the guiding means are at the peripheries of the wheels. In other words, the nearer the guiding members are to the center of rotation, the greater the reduction in such relative movement in a vertical plane and the greater the reduction in wear on the guiding members.

In Fig. 10, the ribs 16$^b$ on the links 14$^b$ are formed with guide flanges 19$^b$ that engage with flanges 30 on guide rollers 31 journaled in brackets 32 on the hub portion 33 of the wheels 12. The flanges 30 are spaced far enough apart to engage the flanges on the ribs of the links whether the latter be male or female links, as will be readily understood.

What is claimed is:

1. In an endless track mechanism, the combination of a series of link members constituting said track, a pair of axially spaced wheels around which said links pass, a guide member on each of said wheels projecting axially inwardly therefrom at a point spaced from the periphery of the wheel, and cooperating guide surfaces on said links intermediate the guide members on said wheels.

2. In an endless track mechanism, the combination of two laterally spaced wheels, an annular flange on each wheel projecting into the space between said wheels, guiding surfaces on said flanges, a series of tread links adapted to travel on said wheels, and elongated guide surfaces on said links engageable with the guiding surfaces on said flanges.

3. In an endless track mechanism, the combination of two laterally spaced wheels, an annular flange on each wheel projecting into the space between said wheels, guiding surfaces on said flanges, a series of tread links adapted to travel on said wheels, vertical ribs on said links and elongated guiding surfaces on said ribs engageable with the guiding surfaces on said wheel flanges.

4. In an endless track mechanism, the combination of a pair of laterally spaced wheels, guide flanges on said wheels projecting toward one another, said flanges being located between the peripheries and axes of said wheels, a series of male and female tread links adapted to pass around said wheels, a vertical rib on each male link, a pair of vertical ribs on each female link, and elongated guide flanges on said ribs engageable with the guide flanges on said wheels.

5. In an endless track mechanism, the combination of a pair of wheels coaxially arranged in spaced relation to each other, a series of tread links having laterally extending shoe portions which ride upon the peripheries of the wheels, rib portions which extend radially inwardly between the wheels in spaced relation thereto, and laterally extending guide portions at the inner ends of said rib portions, which laterally extending guide portions alone contact with the opposing side walls of said wheels, said contact with each wheel being along a narrow band spaced well inwardly from the periphery of the wheel.

6. In an endless track mechanism, the combination of a pair of wheels coaxially arranged in spaced relation to each other, an annular rib on each of said wheels, said ribs being opposed to each other, extending into the space between the wheels at a fixed distance from the peripheries of the wheels, a series of tread links having laterally extending shoe portions which ride upon the peripheries of said wheels, and rib portions which extend radially inwardly into the space between said wheels with their inner ends extending between and guided by the opposed annular ribs of said wheels.

JOHN TURNER MOORE.